United States Patent
Oshima et al.

[11] Patent Number: 6,132,848
[45] Date of Patent: Oct. 17, 2000

[54] INLAID DECORATIVE SHEET, ITS MANUFACTURING METHOD AND MANUFACTURING APPARATUS

[75] Inventors: Masahiro Oshima; Iwao Hasegawa; Yasuo Kita; Hiroshi Sasaki, all of Osaka, Japan

[73] Assignee: Meiwa Gravure Co., Ltd., Osaka, Japan

[21] Appl. No.: 08/988,219

[22] Filed: Dec. 10, 1997

[30] Foreign Application Priority Data

Mar. 17, 1997 [JP] Japan .................................. 9-063527

[51] Int. Cl.⁷ ...................................................... B32B 3/00
[52] U.S. Cl. ...................... 428/161; 428/172; 428/205; 428/207; 428/343
[58] Field of Search ................... 428/67, 156, 161, 428/163, 172, 174, 204, 207, 213, 343, 542.2, 913.3

[56] References Cited

U.S. PATENT DOCUMENTS

| 4,210,693 | 7/1980 | Regan et al. ......................... 428/152 |
| 5,059,471 | 10/1991 | McNally .................................. 428/143 |
| 5,429,857 | 7/1995 | Amemiya et al. ....................... 428/156 |
| 5,773,110 | 6/1998 | Shields .................................. 428/40.1 |

FOREIGN PATENT DOCUMENTS

| 58-16818 | 1/1983 | Japan . |
| 62-124944 | 6/1987 | Japan . |
| 3-33500 B2 | 5/1991 | Japan . |
| 4-14500 | 1/1992 | Japan . |
| 4-55851 B2 | 9/1992 | Japan . |
| 6-155487 | 6/1994 | Japan . |
| 6-218898A | 8/1994 | Japan . |
| 3004483 U | 9/1994 | Japan . |
| 7-3219 | 1/1995 | Japan . |
| 7-44955 | 12/1995 | Japan . |
| 8-207222A | 8/1996 | Japan . |

*Primary Examiner*—Nasser Ahmad
*Assistant Examiner*—Derek Jessen
*Attorney, Agent, or Firm*—Kubovcik & Kubovcik

[57] ABSTRACT

There is provided an inlaid decorative sheet in which a colorless or colored light transmissible first uneven pattern is formed, and a second uneven pattern is formed by inlaying on one side. Accordingly, even the portion in which the first pattern and the second pattern are overlapped, the two patterns look stereographic to show excellent design and decorative features.

13 Claims, 6 Drawing Sheets

INLAID DECORATIVE SHEET, ITS MANUFACTURING METHOD AND MANUFACTURING APPARATUS

BACKGROUND OF THE INVENTION

The present invention relates to a decorative sheet such as table runner, table cloth, bath room curtain, window lining sheet, bag material and the like, and its manufacturing method and manufacturing apparatus.

Conventional, decorative sheets of the above kind are supplied with improved design characteristics by printing patterns on the obverse or reverse side of a synthetic resin sheet or providing an uneven surface by embossing. Also, bottom dye printing and top dye printing using an embossing roll are known. Besides, there is a chemical embossing process for forming uneven patterns on a synthetic resin sheet with a printing ink incorporated with foam suppressing agent such as trimellitic acid so as to suppress foaming of the printing ink-laid surface of the foamed sheet (synthetic resin sheet).

However, the method of using an embossing roll involves problems such that the uneven patterns provided by the embossing roll are shallow in depth and the patterns are liable to be extinguished, and it is hard to obtain a lustrous sheet of porcelain tone. Moreover, there is a problem that the foamed sheet having a foamed part on the surface is weak in strength, and when the foam suppressing agent is used, no porcelain-like luster is obtainable.

In view of the above, the present inventors proposed methods for producing a lustrous sheet on which uneven patterns are precisely formed in Japanese Patent No. 1669906 and Japanese Patent No. 1767264. According to these methods, a long length base sheet coated on one side with a paste form resin is pressed by thrusting the sheet through the space between the metal cylinder provided with a heating device for gelation and a pressing roll and uneven patterns are formed with uneven impressing patterns formed on either side of the cylinder and the pressing roll. However, in recent years demands for a more design-rich gorgeous decorative sheet are increased.

BRIEF SUMMARY OF THE INVENTION

The present invention has been devised to solve the above problems. An object of the present invention is to provide an inlaid decorative sheet having increased gorgeous appearance and excellent design and decorative characters by additionally laying an inlaid pattern on the original pattern, its manufacturing method and manufacturing apparatus.

An inlaid decorative sheet according to the present invention is characterized in that a colorless or colored light transmissible first uneven pattern is formed, and a second uneven pattern is formed by inlaying on one side. Accordingly, even in the portion in which the first pattern and the second pattern are overlapped, the two patterns look stereographic to show excellent design and decorative features. Also, because the pattern on the viewer side appears different between the case of viewing from one side and the case of viewing from the other side, a different atmosphere can be enjoyed by selecting the viewing side.

The first uneven pattern and the second uneven pattern may have different colors. Here, the first uneven pattern and the second uneven pattern may be either one colorless and one colored, or both colored. In the combination of colorless and colored ones, in addition to the colorless uneven pattern, the colored pattern looks clearly as if it is floating, thus giving an inlaid decorative sheet having more excellent design and decorative features. In case of both patterns being colored, the colors look in mixture on the overlapped portion of patterns, so that an inlaid decorative sheet having more abundant colors can be obtained. Moreover, because the pattern and color on the viewer side appear different between the case of viewing from one side and the case of viewing from the other side, a quite different atmosphere can be enjoyed by selecting the viewing side.

Pearl pigment, metal powder or metal foil may be mixed or scattered in the synthetic resin by which the second pattern is to be formed. By so doing, by the pearl pigment, metal powder or metal foil, light is reflected to give rich colored design and decorative characteristics.

In case of a transparent adhesive applied to one side of the sheet, the sheet can be used by being put on, for example, a window, wall or other sheet. When the sheet is applied to a window, the light shows complicated refraction and reflection by the uneven patterns to show rich stereographic appearance, and further gives an effect like stained glass.

When one side is processed flat, a porcelain tone, lustrous inlaid decorative sheet is obtainable.

A method for manufacturing an inlaid decorative sheet according to the present invention comprises the steps of: applying a first paste form synthetic resin to one side of a base sheet, forming a first uneven pattern by pressing a first impressing body having a first uneven pattern formed thereon onto the base sheet coated with the first paste form synthetic resin, filling a second paste form synthetic resin in a second impressing body on which a second uneven pattern is formed, transferring the second paste form synthetic resin to the sheet on which the first uneven pattern is formed by bringing one side of said sheet into contact with the second impressing body in which the second paste form synthetic resin is filled, and inlaying the second paste form synthetic resin by pressing a flat surface onto the surface to which the second paste form synthetic resin is transferred.

An apparatus for manufacturing an inlaid decorative sheet according to the present invention comprises: a coating apparatus for coating a first paste form synthetic resin to one side of a base sheet, an uneven pattern forming apparatus for forming a first uneven pattern by pressing a first impressing body having a first uneven pattern formed thereon onto the base sheet coated with the first paste form synthetic resin, a filling apparatus for filling a second paste form synthetic resin in a second impressing body on which a second uneven pattern is formed, a transfer apparatus for transferring the second paste form synthetic resin to the sheet on which the first uneven pattern is formed by bringing one side of said sheet into contact with the second impressing body in which the second paste form synthetic resin is filled, and an inlaying apparatus for inlaying the second paste form synthetic resin by pressing a flat surface onto the surface to which the second paste form synthetic resin is transferred.

According to these manufacturing method and apparatus, at first, a first paste form synthetic resin is applied to one side of the base sheet, after which the first impressing body on which the first uneven pattern is formed is pressed to form a first uneven pattern. Further, the second paste form synthetic resin filled in the second impressing body on which the second uneven pattern is formed is brought into contact with one surface side and transferred to said sheet. When the flat surface is pressed to said surface, the second paste form synthetic resin is inlaid.

The above and further objects and features of the invention will more fully be apparent from the following detailed description with accompanying drawings.

DETAILED DESCRIPTION OF THE INVENTION

Hereinafter, the present invention is described in detail with reference to the drawings which show the embodiments thereof.

Figure 1:
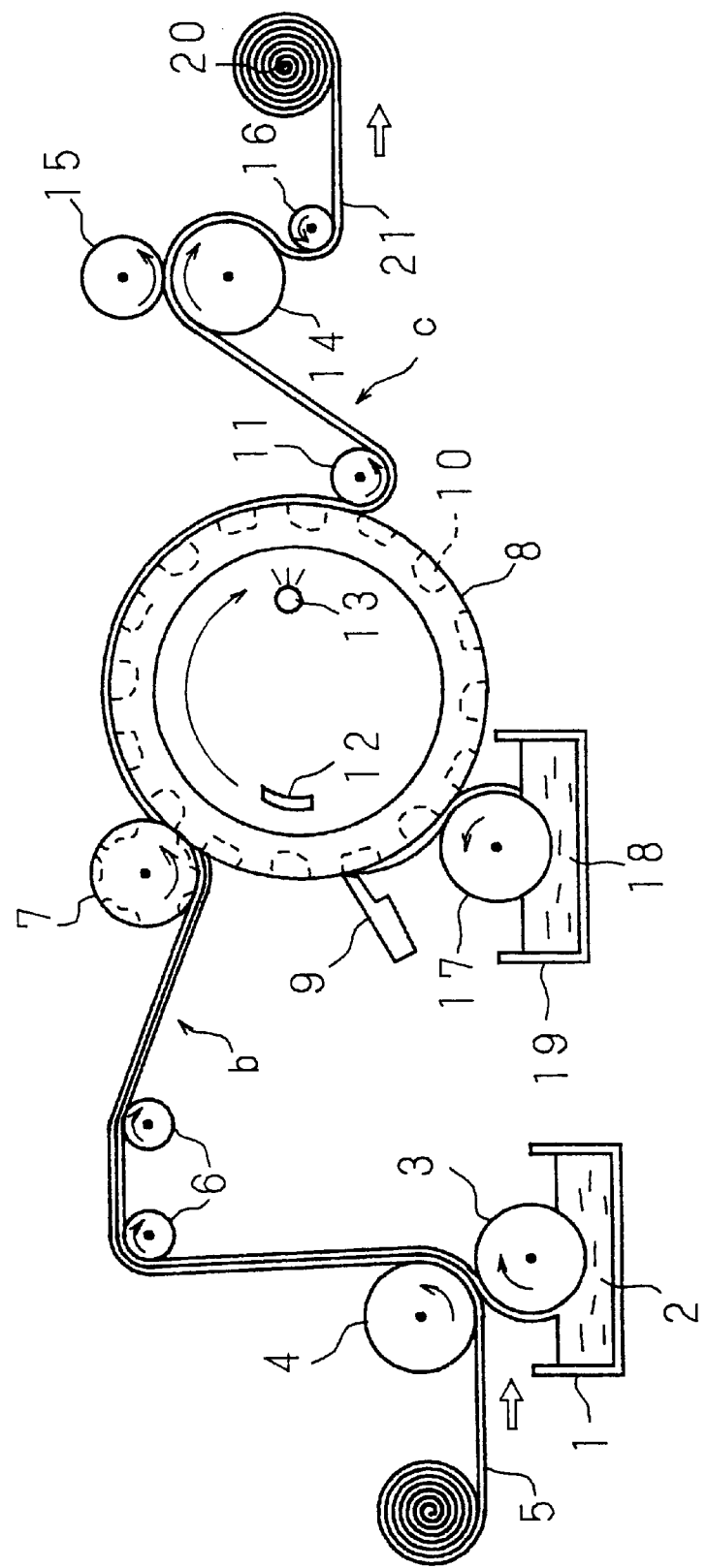
FIG. 1 is a schematic view showing an apparatus for manufacturing an inlaid decorative sheet according to the present invention.

FIG. 1 is a schematic view showing the constitution of an apparatus for manufacturing an inlaid decorative sheet according to the present invention. In the figure, numeral 1 denotes a storage tank for storing a paste form resin 2. Above the storage tank 1, a rubber made coating roll 3 is disposed in a manner that its approximately half circumference is dipped in the paste form resin 2. Above the coating roll 3 a rubber receiving roll 4 is provided in an opposed state. On the right upper part of the receiving roll 4 there are provided guide rolls 6,6 at nearly the same height at a predetermined distance, and further on the right side thereof there is a rubber made pressure roll 7 in which the predetermined pattern (first uneven pattern) is engraved in concave form. Below the pressure roll 7, there is a large diameter metal made cylinder 8 on which the predetermined pattern (second uneven pattern) is engraved in concave form by the concave engraving part 10 and which rotates at a predetermined speed, provided in a state to be nearly in contact with the pressure roll 7.

Inside the cylinder 8 there is a heater 12 for heating the inside surface of the cylinder 8 on the upstream side from the pressure roll 7 in its direction of rotation, and toward the inside of the cylinder 8 on the downstream side from the pressure roll 7 there is provided a cooler 13 for blowing cooling water toward the inside. Further, below the cylinder 8, a coating roll 17 is disposed in near position, so that approximately the half circumferential part of the coating roll 17 can be dipped in a paste form resin 18 in a storage tank 19. On the outer periphery of the cylinder 8 positioned between the coating roll 17 and the heater 12, there is installed a doctor impressing body 9 for scraping the extra deposited paste form resin 18.

Outside in the rotation direction of the cylinder 8 after passing through the cooler 13 there is a releasing roll 11 for releasing from the cylinder 8 a long length base sheet 5 on which the paste form resins 2, 18 are deposited. At a moderate distance from the releasing roll 11, there is a rotatable heating cylinder 14 whose surface is mirror-finished. Above the heating cylinder 14 a smooth rubber roll 15 is disposed nearby, and underneath a guide roll 16 is provided. On the lateral side of the guide roll 16 there is provided a taking up shaft 20.

Next, a method for manufacturing an inlaid decorative sheet using the apparatus constituted as above is explained.

On the left lateral side of the coating roll 3 the long length base sheet 5 being a synthetic resin sheet having elasticity and light transmissibility is set under the condition of being wound in a roll form. The storage tank 1 is filled with the paste form resin 2, and the storage tank 19 is filled with the paste form resin 18.

Firstly, the drawn out long length base sheet 5 is let through the space between the coating roll 3 and the receiving roll 4, and the paste form resin 2 is coated uniformly on one side thereof through the coating roll 3. The long length base sheet 5 coated with the paste form resin 2 is transferred to the spot between the pressure roll 7 and the cylinder 8 via the guide rolls 6,6. The cylinder 8 on this position is such that the paste form resin 18 is filled in the engraved part 10 with the coating roll 17, extra paste form resin 18 is scraped off with the doctor impressing body 9, and further heated to about 180–200° C. by the heater 12. By passing through this part, the paste form resin 2 is gelated, and the long length base sheet 5 and the paste form resin 2 collaborate to form a pattern embossed to the other surface by the pressure roll 7. And further, on one side, namely, on the paste form resin 2, the paste form resin 18 is applied in the pattern of the engraving part 10.

Subsequently, these patterns are cooled by the cooler 13, and the paste form resins 2 and 18 are cured and released from the cylinder 8 with the releasing roll 11. And, they are passed through the space between the heating cylinder 14 and the smooth rubber roll 15 and heated again, and the one surface side of the long length base sheet 5, i.e., the surface having the convex paste form resin 18, is smoothed by the mirror finished heating cylinder 14. As a result, the pattern formed by the paste form resin 18 is inlaid to give an inlaid decorative sheet 21 having unevenness on the other surface side which is in contact with the smooth rubber roll 15. The resulting inlaid decorative sheet 21 is taken up by the winding shaft 20.

Figure 2A:
FIGS. 2A to 2D are schematic sectional views for illustrating the manufacturing process of the inlaid decorative sheet according to the present invention.
Figure 2B:
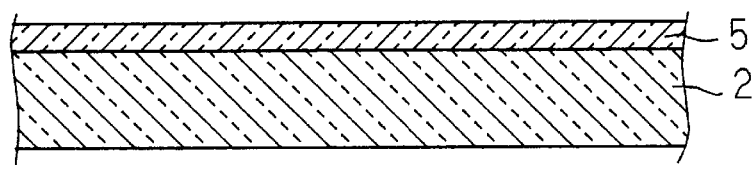
Figure 2C:
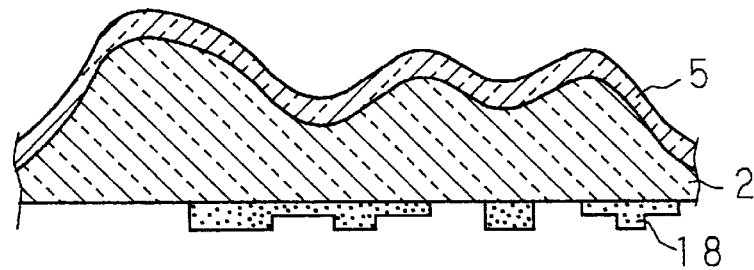
Figure 2D:
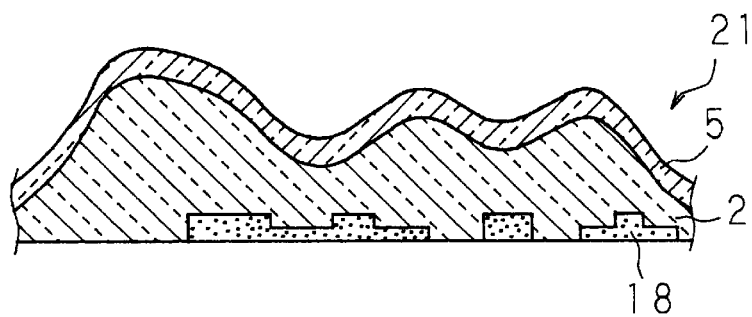

FIGS. 2A to 2D are schematic sectional views for illustrating the process for manufacturing the inlaid decorative sheet. FIG. 2A shows the drawn out long length base sheet 5, and FIG. 2B shows a state where the paste form resin 2 is applied with the coating roll 3. FIG. 2C shows uneven patterns formed with the long length base sheet 5 and the paste form resin 2 by the convex part of the pressure roll 7, and a convex form of the paste form resin 18 filled on the engraved part 10 of the cylinder 8 deposited on the paste form resin 2. FIG. 2D shows the inlaid decorative sheet 21 in which the pattern by the paste form resin 18 is inlaid.

EXAMPLE 1

Figure 3:
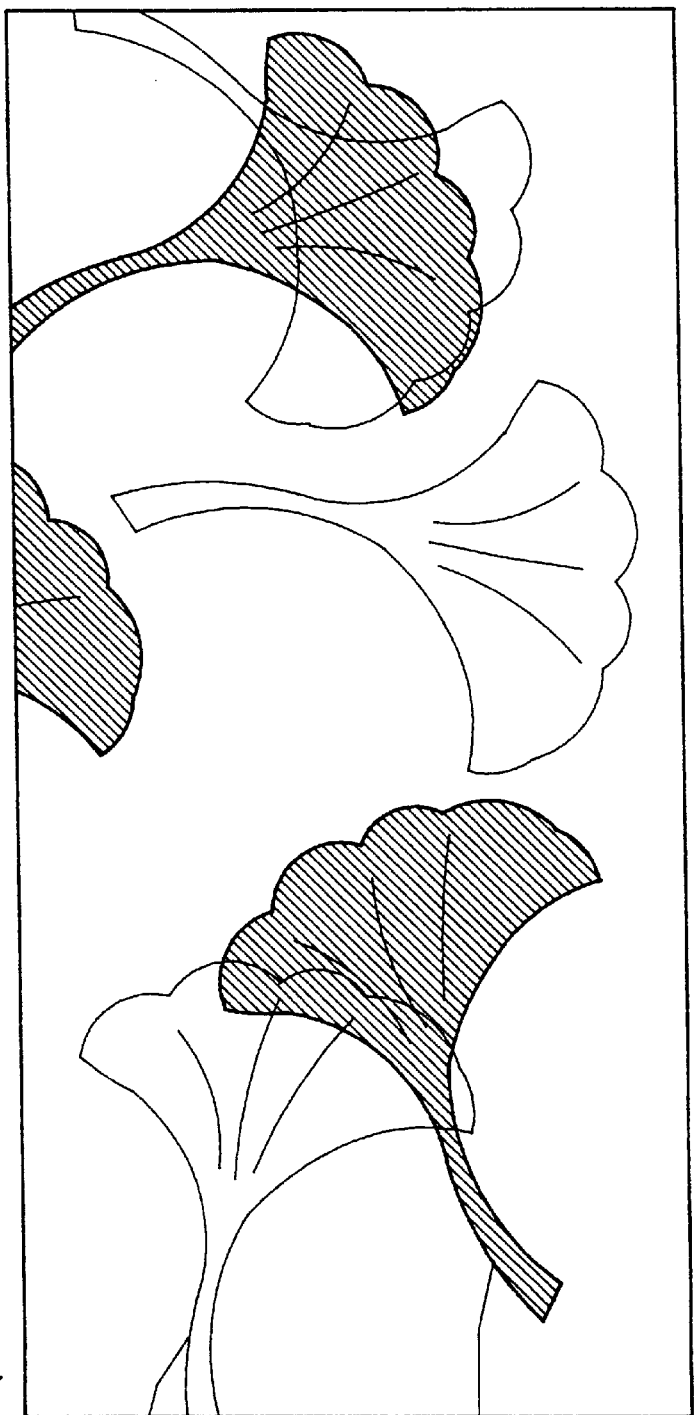
FIG. 3 is a plan view showing an inlaid decorative sheet obtained in Example 1.

FIG. 3 is a plan view showing the inlaid decorative sheet 21 obtained according to Example 1. As the long length base sheet 5 there is used a colorless transparent plastic sheet. As the paste form resin 2, a colorless transparent PVC sol is used. The pressure roll 7 is provided with a pattern of ginkgo leaves as concave parts. On the cylinder 8, the pattern of ginkgo leaves are formed with engraved parts 10 in different positions and direction from the pattern of the pressure roll 7. As the paste form resin 18 a transparent PVC sol colored in yellow is used. A recipe of the paste form resins 2, 18 is shown in Table 1.

By the above, a colorless, transparent pattern of ginkgo leaves 22 formed by unevenness only and the pattern of ginkgo leaves 23 formed by the paste form resin 18 in yellow color and unevenness are exquisitely harmonized with some overlapping portions, and a lustrous gorgeous inlaid decorative sheet 21 is obtained.

EXAMPLE 2

Figure 4:
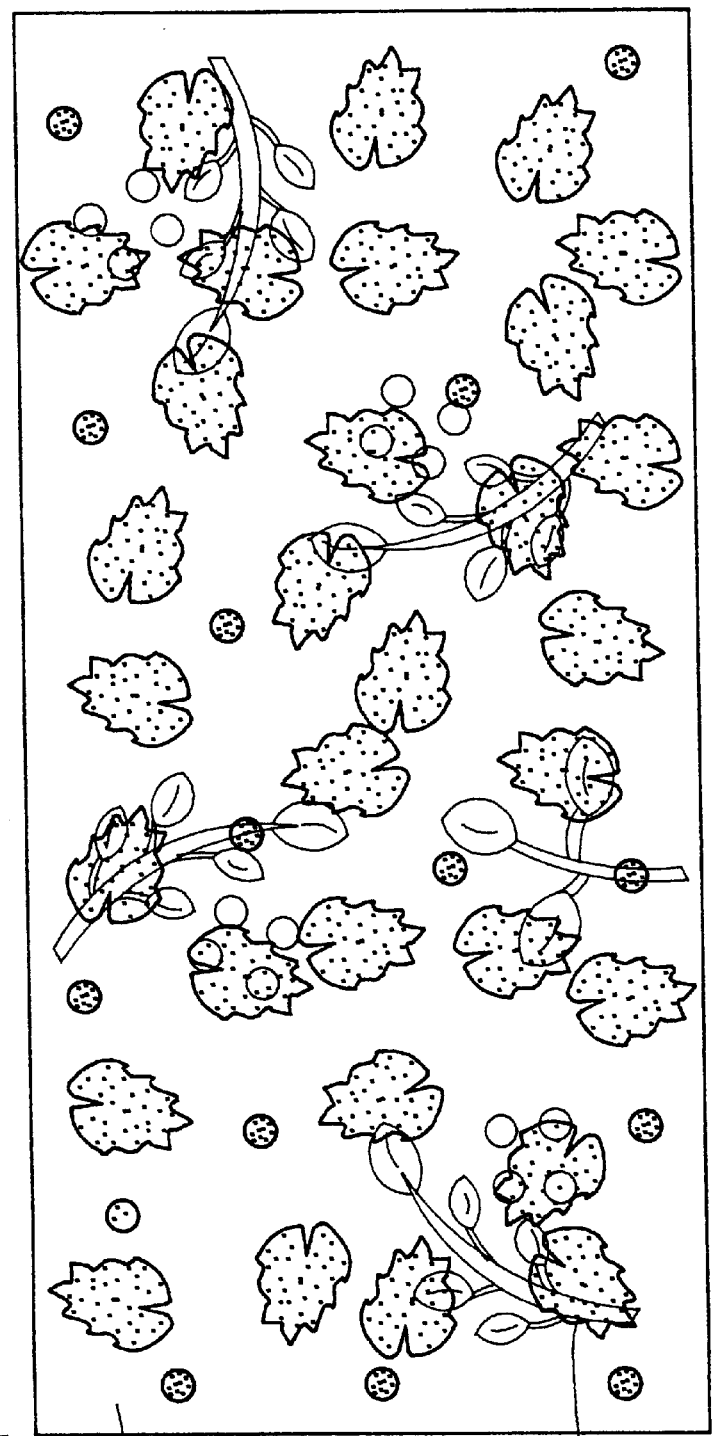
FIG. 4 is a plan view showing an inlaid decorative sheet obtained in Example 2.

FIG. 4 is a plan view showing an inlaid decorative sheet 21 obtained according to Example 2. As the long length base sheet 5 there is used a colorless transparent plastic sheet. As the paste form resin 2, a colorless transparent PVC sol the same as that of Example 1 is used. The pressure roll 7 is provided with a pattern of box tree twigs with leaves and nuts as concave parts. On the cylinder 8, the patterns of zelkova tree leaves and water drops are formed with engraved parts 10. As the paste form resin 18 there is used a yellow colored transparent PVC sol the same as that of Example 1.

By the above, the colorless, transparent pattern of twigs 24 formed by unevenness only and the patterns of zelkova tree leaves and water drops 25 formed by the paste form resin 18 in yellow color and unevenness are exquisitely harmonized with some overlapping portions, and a lustrous gorgeous inlaid decorative sheet 21 is obtained.

EXAMPLE 3

Figure 5:
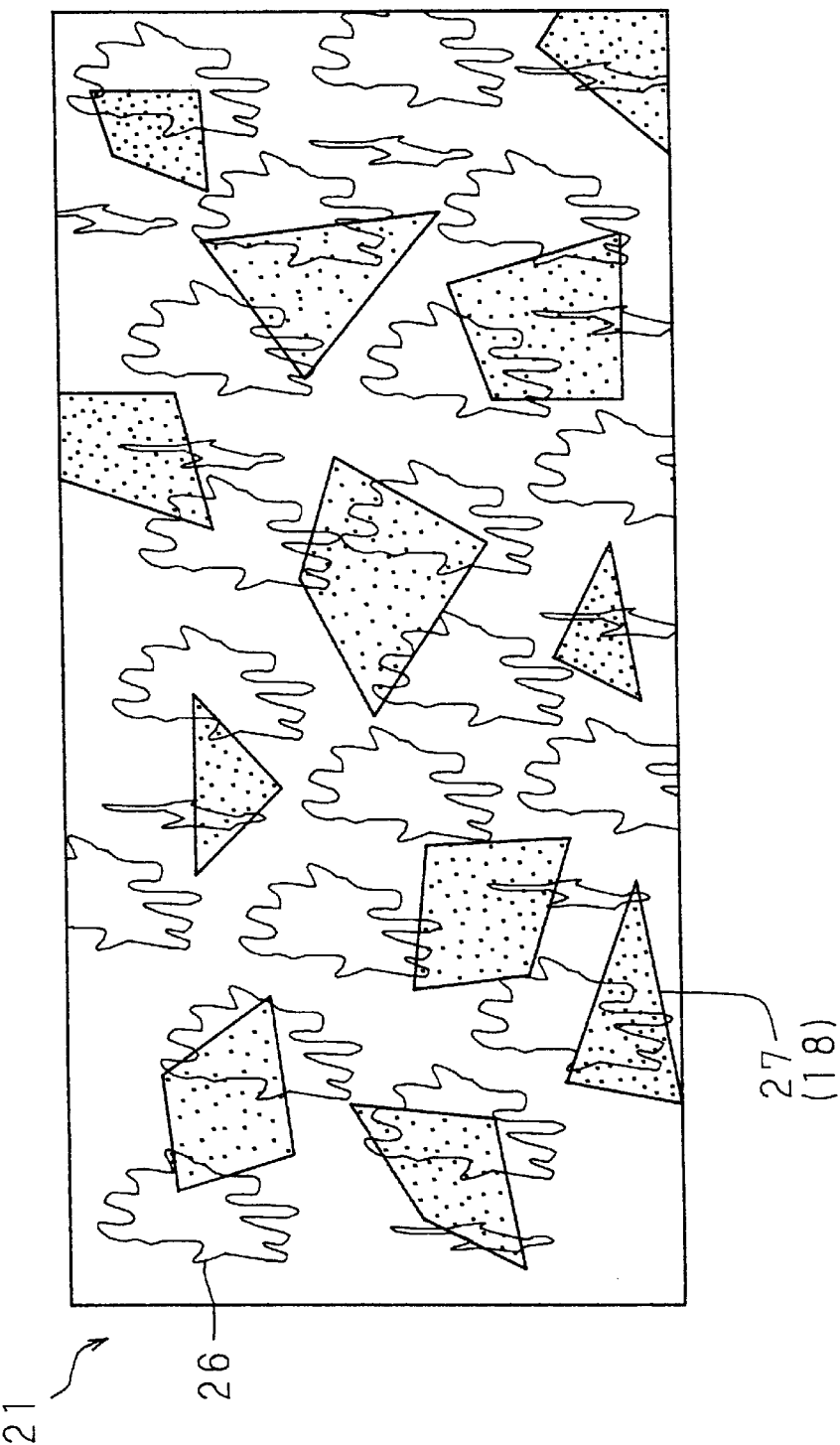
FIG. 5 is a plan view showing an inlaid decorative sheet obtained in Example 3.
Figure 6:
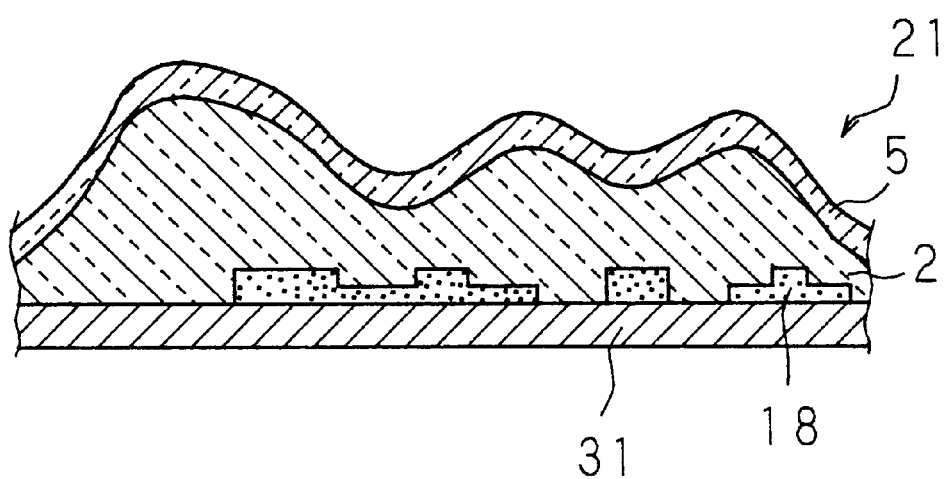
FIG. 6 is a schematic sectional view showing an inlaid decorative sheet according to Example 3.

FIG. 5 is a plan view showing an inlaid decorative sheet 21 obtained according to Example 3. As the long length base sheet 5 there is used a colorless transparent plastic sheet. As the paste form resin 2, a colorless transparent PVC sol the same as that of Example 1 is used. The pressure roll 7 is provided with a pattern like a glass impressing body spread with rain drops as concave parts. On the cylinder 8, the patterns of triangles and squares having diversified shapes and sizes are formed with concave parts 10. As the paste form resin 18 a gold powder paste is used. Further, in this Example, as shown in FIG. 6, an adhesive 31 is applied to the flattened reverse surface so that the sheet can be used as a window lining sheet.

By the above, the colorless, transparent pattern like a glass impressing body spread with rain drops 26 formed by unevenness only and the patterns of triangles and squares 27 formed by gold powder and unevenness by the paste form resin 18 are exquisitely harmonized with some overlapping portions, and a lustrous gorgeous inlaid decorative sheet 21 is obtained. By laying this inlaid decorative sheet 21 on a window, for example, the light coming in from outdoors is refracted and reflected to show the pattern in stereographic style, with glittering of gold powder portions, thereby giving an effect like a stained glass.

Instead of the gold powder, there may be used a pearl pigment, other metal powder, metal foil, and so on.

The inlaid decorative sheet according to the present invention may be used, in addition to the examples given above, as a sheet for table runner, table cloth, and the like by cutting the sheet into predetermined shapes and predetermined sizes. Also, by giving various sewing processess, it can be used in various forms such as a bag, lamp shade, or the like.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalent of such metes and bounds thereof are therefore intended to be embraced by the claims.

TABLE 1

| COMPOSITE | | WEIGHT PARTS | |
| --- | --- | --- | --- |
| | | PASTE RESIN 2 (COLORLESS TRANSPARENT) | PASTE RESIN 18 (YELLOW TRANSPARENT) |
| PASTE RESIN TOSO Co. Ltd. TOSO R-890 | | 100 | 100 |
| DOP SEKISUI KAGAKU Co. Ltd. | | 48 | 48 |
| STABILIZING AGENT | BZ-100CJ Ba-Zn-TYPE st | 2.5 | 2.5 |
| KATSUDA KAKO Co. Ltd. | ABC-18J Zn-TYPE st | 0.5 | 0.5 |
| COLORING AGENT TOYO INK Co. Ltd. TV-1162 | | — | 0.5 |

What is claimed is:

1. An inlaid decorative sheet comprising:
    a laminate of a colorless or colored light transmissible base sheet and a layer of a first synthetic resin; and
    an inlay of a second synthetic resin inlaid into said first synthetic resin layer,
    said inlaid decorative sheet having a first outer surface formed by an outer surface of said base sheet and a second outer surface formed by an outer surface of said first synthetic resin layer,
       wherein the first outer surface is uneven and forms an uneven pattern,
       and the inlay is flush with the outer surface of said first synthetic resin layer and has an outer surface exposed on said second outer surface.

2. An inlaid decorative sheet according to claim 1, wherein the first uneven pattern and the inlay are different in colors.

3. An inlaid decorative sheet according to claim 1, further comprising a transparent adhesive applied to said second outer surface.

4. An inlaid decorative sheet according to claim 1, wherein said second outer surface is flat.

5. An inlaid decorative sheet according to claim 1, wherein pearl pigment, metal powder, or metal foil is mixed or scattered in the synthetic resin forming the inlay.

6. An inlaid decorative sheet according to claim 2, wherein pearl pigment, metal powder, or metal foil is mixed or scattered in the synthetic resin forming the inlay.

7. An inlaid decorative sheet according to claim 2, further comprising a transparent adhesive applied to said second outer surface.

8. An inlaid decorative sheet according to claim 2, wherein said second outer surface is flat.

9. An inlaid decorative sheet according to claim 5, further comprising a transparent adhesive applied to said second outer surface.

10. An inlaid decorative sheet according to claim 5, wherein said second outer surface is flat.

11. An inlaid decorative sheet according to claim 6, further comprising a transparent adhesive applied to said second outer surface.

12. An inlaid decorative sheet according to claim 6, wherein said second outer surface is flat.

13. An inlaid decorative sheet according to claim 1, wherein and said second outer surface is smooth.

* * * * *